United States Patent Office 3,088,868  
Patented May 7, 1963

3,088,868  
ORALLY-ACTIVE THERAPEUTIC COMPOSITIONS AND PROCESS FOR USING SAME  
Emanuel Windsor, Sun Valley, Calif., assignor to Riker Laboratories, Inc., Los Angeles, Calif., a corporation of Delaware  
No Drawing. Filed Aug. 18, 1958, Ser. No. 755,390  
10 Claims. (Cl. 167—55)

This invention relates to compositions which enable oral administration of medicinal substances in effective therapeutic or prophylactic dosage. More particularly, it relates to compositions to enable medicinal substances whose therapeutic effect depends upon their being absorbed into the blood stream and which per se are not administrable efficaciously per os, to be effectively administered orally. Especially, it relates to compositions to enable polysaccharide sulfates having anti-coagulant and/or antilepemic activity when administered parenterally to be effective orally at practical dosage levels.

Among the anti-coagulant medicaments available to the medical profession at the present time heparin (a natural sulfated polysaccharide) is clinically the most desirable; various synthetic sulfate esters of polysaccharides have also been proposed. Heparin is especially useful in the treatment of thrombosis and embolism because of its immediate action. However, its main disadvantage is that it has to be given by injection because it is not absorbed from the gastro-intestinal tract. It disappears rapidly from the blood stream and following its administration the clotting time returns to normal in 60 to 90 minutes; it therefore had to be administered repeatedly by subcutaneous infusion. Previous attempts to prolong the action of parenterally injected heparin have resulted in products which produce pain upon administration.

Therefore many efforts have been made to synthesize a satisfactory substitute for heparin using substances chemically somewhat similar in structure. Among these have been sulfates of polysaccharides and their derivatives such as cellulose, chitin, chondroitin, alginic acid, dextran, dextrin, xylan, amylose, amylopectin, pectin acid and the like. However these synthetic substances have been generally unsuccessful owing to their having a lower therapeutic ratio than heparin, higher toxicity and having an effect of only brief duration. Furthermore these anti-coagulant polysaccharide substances could hitherto only be given in effective doses parenterally.

The compositions of the present invention are particularly suitable for making therapeutically effective per os the polysaccharide sulfate products disclosed in the copending application of Francis J. Petracek and Marshall D. Draper, entitled "Novel Anti-Lipemic Agents," Serial No. 755,387, filed concurrently with this application, now Patent No. 3,017,407. There are disclosed in said Petracek et al. application, corn syrup solids and corn dextrin having an average molecular size of from 5 to 15 (preferably 8 to 12) glucose units per molecule and which have been sulfated to contain on an average of between about 1.5 to 3 (preferably 2 to 3) sulfate groups per glucose unit. The resulting sulfated esters of these polysaccharides contain the glucose units joined predominantly by alpha 1:4 and to a lesser extent by alpha 1:6 linkages. These polysaccharide sulfates of said Petracek et al. application are characterized by having a high degree of lipemia-clearing activity, low anti-coagulant effect, and low toxicity. It is intended to incorporate into this application by reference the disclosure of said Petracek et al. application in its entirety. Other substances which have lipemia-clearing activity and which may be benefitted by the compositions of the present invention are sodium polyethylene sulfonate, laminarin sulfate M, fucoidin sulfate. These foregoing sulfated polysaccharides are characterized by being themselves active to provide lipemia-clearing activity only when administered parenterally. However when these substances are employed in the compositions of the present invention, they provide effective lipemia-clearing activity even when administered orally.

It is an object of this invention to produce orally-effective compositions of therapeutic substances, the therapeutic effect of which depend on their being absorbed into the blood stream, previously administrable in effective doses only parenterally.

It is another object of this invention to produce compositions of anti-coagulant compounds which can be administered in effective and practical doses orally.

It is also an object of this invention to produce compositions of antilipemic agents which can be administered in safe, effective and practical doses orally.

It is another object to provide a process of effectively administering orally therapeutic substances which could not otherwise effectively be administered, whereby they are enabled to be absorbed from the gastro-intestinal tract.

Other objects will be apparent to those skilled in the art from the present description.

The present invention results from the unexpected discovery that by adding to the medicament an adjuvant compound which is a non-toxic complexing agent, and especially an amino-acid salt according to the invention, the product acquires properties which are not possessed by the individual substances per se, viz., oral effectiveness and absorbability from the gastro-intestinal tract, or enhancement of insignificant oral potency to an effective level of oral potency.

The complexing agent or adjuvant compounds according to the invention are the alkali-metal salts of the amino acids and polyamine-polyacids, substantially free from magnesium and calcium ions. Preferably these adjuvants are alkali-metal salts of the amino acids and polyamine-polyacids which are symmetrically substituted on the nitrogen atoms.

Among the polyamine-polyacid chelating compounds which may be used are those which will chelate calcium and/or magnesium and include the alkali-metal salts of ethylene-diamine tetra-acetic acid, O-diamine-cyclohexane tetra-acetic acid, nitrilo-triacetic acid (triglycin) and pyrrolidine-2,5-dicarboxylic acid-N-acetic acid.

There may also be used alkali-metal salts of alkylene-polyamine polyacetic acids of the formula:

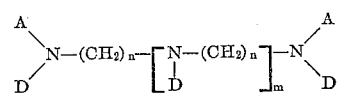

wherein n is a whole number from 2 to 6 inclusive, m is a whole number from 0 to 2 inclusive, D is

—CH$_2$COOH

—CH$_2$CH$_2$COOH and A is the same as D, or lower alkyl or hydroxy lower alkyl. As examples of the carboxylic poly- or diamino acids specifically included within the above formula may be mentioned ethylene diamine N,N'-tetraacetic acid; propylene 1,2-diamine N,N'-tetraacetic acid; 1,3-diamino-propanol-2,N,N'-tetraacetic acid; diethylenetriamine-N,N'-tetraacetic acid; diethylenetriamine-N,N'N''-pentaacetic acid; hexamethylenediamine-N,N'-tetraacetic acid; beta-hydroxyethylethylenediamine-N,N'-triacetic acid, etc.

Other chelating compounds which may be used as adjuvants are alkali-metal salts of di(2-aminoethyl) ether-NNN'N' - tetra - acetic acid (ETHENTA); di - (2 - aminoethyl) ethyleneglycol - NNN'N' - tetra - acetic acid (GLENTA); 1:2 - diaminocyclohexanetetraacetic acid (DCYTA); etc.

Among the other adjuvants which may be employed in accordance with the present invention are the alkali-metal salts of the amino acids, preferably of amino acids symmetrically substituted on the nitrogen atoms, such as the alkali metal salts of di-lower-alkyl-substituted amino acids, including: N,N-dimethylglycine, N,N-diethylglycine, N,N-dimethyl-beta-alanine, N,N-diethylbetaalanine, alpha-N,N-methyl-1-lysine, alpha-N,N-diethyl-1-argenine, among others.

Among the alkali-metal salts of the adjuvants which may be employed are the sodium, potassium and ammonium salts. The sodium, potassium and ammonium salts of ethylenediamine tetra-acetic acid have been found particularly useful. The potassium salts are especially advantageous for use in patients who have certain heart conditions and have to avoid undue intake of sodium.

It is preferred to use the compositions of the invention within a pH range of about 5 to 9, especially between 7 and 9.

Depending upon the particular therapy desired, the patient to be treated and the type of medicament and adjuvant substance chosen, the ratio by weight of the adjuvant to the medicament in the novel compositions should be at least 1:8. The upper limit of adjuvant: medicament ratio is governed by the potency of the medicament and the toxic dose of the adjuvant. It is generally preferred to use a ratio of adjuvant to medicament in the range between about 1:5 and 2:1, with best results in most cases being obtained with between about 1:1 and 1:2.

The new compositions are generally administered in relatively pure form, but they may be combined with inert diluents, such as starch, sugars, various stearates and carbonates, kaolin etc., to provide tablets, gelatin capsules and the like. However it is necessary to avoid excipients containing ionizable calcium or magnesium. Other useful dosage forms are liquid suspensions or solutions, particularly aqueous preparations.

In order more clearly to disclose the nature of the present invention, the following examples illustrating the invention are disclosed. It should be understood, however, that this is done solely by way of example and is intended neither to delineate the scope of the invention nor to limit the ambit of the appended claims. In the examples which follow, and throughout the specification, the quantities of materials are expressed in terms of parts by weight, unless otherwise specified.

EXAMPLE 1

*Effects of Oral Adjuvants With Lipemia-Clearing Polysaccharide Sulfate Fractions in Dogs*

Tripotassium "Versenate" (the tripotassium salt of ethylenediaminetetraacetic acid), disodium "Versenate" and the sodium salt of N,N-dimethylglycine were mixed together separately with a fraction of sulfated polysaccharide having about 12 glucose units and 2.0 sulfate groups per glucose unit prepared as described below, and the mixture administered orally to dogs. The proportions of polysaccharide sulfate to adjuvant were 1:1 and 2:1. Sufficient sulfated polysaccharide was administered to the dogs to provide a dosage at a level of 100 mg./kg. and adjuvant dosages were 50 and 100 mg./kg. Blood specimens were taken before and 1, 2, 3, 4, and 5 hours after the dogs swallowed the capsule containing the sulfated polysaccharide and adjuvant. The antilipemic effects were determined by measuring the clearing activities in terms of Grossman units, according to the method described in the Journal of Laboratory and Clinical Medicine 43 (1954), 445. The results are tabulated below giving the maximum mean lipemia-clearing activities, compared with a control of the sulfated polysaccharide alone:

| Adjuvant | Adjuvant dose (mg./kg.) | Number of dogs | Mean clearing activity (Grossman units) | |
|---|---|---|---|---|
| | | | Before | Maximum |
| Disodium Versenate | 50 | 6 | 0.00 | 5.73 |
| Tripotassium Versenate | 50 | 4 | 0.03 | 3.74 |
| | 100 | 2 | 0.00 | 5.26 |
| Dimethylglycine sodium salt | 50 | 6 | 0.12 | 2.16 |
| Sulfated polysaccharide alone | Nil | 6 | 0.04 | 1.19 |

The polysaccharide sulfate employed in the foregoing example was produced as follows:

To 800 ml. of dry pyridine in a 3-liter 3-necked flask was added 120 ml. of chlorosulfonic acid while the temperature was maintained between 10–20° C. The mixture was stirred for one hour at room temperature after the last addition of acid. To the sulfating medium was added 75 gm. of dry corn starch dextrin [having an intrinsic viscosity $(\eta)=0.068$ in 0.1 N potassium hydroxide] in 200 ml. of pyridine. The mixture was heated for 10 hrs. on the steam bath with stirring and then was allowed to cool at room temperature. The upper pyridine layer was decanted from the lower solid cake and the cake was then dissolved in 400 ml. of water. The aqueous solution was poured with stirring into 5 liters of methanol and the residue (pyridine salt of polysaccharide sulfate) was dissolved in 1.75 liters of water containing 17.5 gm. of sodium chloride. The solution was adjusted to pH 9 with 6 N sodium hydroxide and 5.25 liters of methanol was added to precipitate the sodium salt of the corn starch dextrin sulfate as a granular material which was washed with methanol and ether to give a total yield of 223.5 gm.

To a solution of 184.5 gm. of the above material in 3510 ml. of water and 32 gm. sodium chloride, was added 625 ml. of acetone. After standing overnight at 0° C. the filtrate was decanted from the lower syrupy layer (discarded) and to the filtrate was added 553 ml. of acetone and again allowed to stand overnight. The lower syrupy layer was recovered by trituration with methanol to yield 112.7 gm. of white granular material (59%) which had an average molecular size of 12 glucose units, an average molecular weight of 4000, and 2.0 sulfate groups per glucose residue.

The polysaccharide sulfate samples employed in the following examples were produced in accordance with the above-identified application of F. J. Petracek et al. and in accordance with the following procedures:

*Sample No. 1.*—Corn starch dextrin was sulfated in accordance with the procedure described for producing the polysaccharide sulfate employed in Example 1 above to provide a dextrin sulfate having an average molecular size of approximately 12 glucose units per molecule and having 2.0 sulfate groups per glucose unit.

*Sample No. 2.*—was produced from dry corn syrup solids (Staley Company) (obtained from 43° Baumé corn syrup) by sulfating the corn syrup solids in accordance with the procedure employed in Example 1, and precipitating the resulting product with acetone to collect the fraction precipitated by between 25 to 30% by volume of acetone. The resulting corn syrup solids sulfate had an average molecular size of 11.1 glucose units per molecule and contained 2.37 sulfate groups per glucose unit.

EXAMPLE 2

*Effects of Oral Adjuvants With Polysaccharide Sulfate Fractions in Dogs*

The polysaccharide sulfates prepared in accordance with the above-identified application of F. J. Petracek and which are described as Samples 1 and 2 hereinabove were given to dogs orally with adjuvant at various dosage ratios. The adjuvant used was tripotassium Versenate.

Blood samples were taken for clotting time determination before and at 1 hour intervals after administration of the drug. The results of the clotting time determinations in accordance with the well-known Lee-White method are as follows:

LEE-WHITE CLOTTING TIME IN MINUTES (AVERAGE)

| Sample number | Number of dogs | Time after administration of drug | | | | | |
|---|---|---|---|---|---|---|---|
| | | Control | 1 hr. | 2 hr. | 3 hr. | 4 hr. | 5 hr. |
| No. 2: 100/50 [1] 50/50 [1] | 2 | 10.5 7.5 | 16.0 13.0 | 13.0 18.0 | 11.0 12.5 | 10.5 10.0 | 12.0 8.0 |
| No. 1: 100/50 [1] | 4 | 11.0 | 21.5 | 26.0 | 18.5 | 13.5 | |
| Polysaccharide sulfate alone, No. 1 | 2 | 12.0 | 13.0 | 12.5 | 11.0 | 10.5 | 11.0 |

[1] Dose of polysaccharide sulfate/dose of adjuvant.

EXAMPLE 3

*Effects of Orally Administered Heparin Plus Potassium Versenate in Dogs*

Heparin U.S.P. (110 units/mg. potency) was given to a dog at a dose of 100 mg./kg. with 50 mg./kg. tripotassium Versenate in a gelatin capsule. Blood was drawn at hourly intervals for determination of clotting time and lipemia clearing activity in terms of Grossman units. The results are given below:

| Test | Time after administration of drug | | | | |
|---|---|---|---|---|---|
| | Control | 1 hr. | 2 hr. | 3 hr. | 4 hr. |
| Clotting | 11.5 min | 30.5 min | >4 hr | >4 hr | 32.0 min. |
| Lipemia clearing | 0.15 | 1.88 | 1.89 | 2.27 | 0.95. |

It is well known that heparin, when per se administered orally, is ineffective.

EXAMPLE 4

*Effect of Adjuvants on Oral Absorption of Polysaccharide Sulfate in Rats (Antilipemic and Anticoagulant Activities)*

The polysaccharide sulfate employed in Example 1 was administer orally as an aqueous solution containing 500 mg. per 10 ml. and 500 mg. per 10 ml. of adjuvant. 10 ml. of the solution per kg. of body weight was administered by stomach tube to rats. The results are given in the following table:

| Adjuvant | Number of rats | Activity after 4 hrs. | |
|---|---|---|---|
| | | Lipemia clearing (Grossman units) | Coagulation time (Lee-White, min.) |
| None, control | 8 | 0.83±0.55 | 8.0 |
| Disodium Versenate | 9 | 5.29±2.73 | 8.5 |
| Sodium N,N-dimethylglycinate | 19 | 3.58±2.34 | 8.5 |
| Tripotassium Versenate | 10 | 5.68±2.82 | |

EXAMPLE 5

*Effect of Trisodium Versenate on Polysaccharide Sulfate in the Rat*

Twenty-four rats in four equal groups were fasted. One group received nothing, a second group polysaccharide sulfate employed in Example 1 above by stomach tube, a third group trisodium Versenate and the fourth group the same polysaccharide sulfate plus trisodium Versenate. The animals were sacrificed 4 hours later and blood obtained by cardiac puncture was tested for coagulation time and lipemia clearing activity. The results are given below:

| Oral solution at 500 mg./kg. in 10 ml./kg. | Average activity in rat blood at 4 hours | |
|---|---|---|
| | Lipemia clearing (Grossman units) | Coagulation time (Lee-White, minutes) |
| None | 0.05 | 6.7 |
| Polysaccharide sulfate only | 0.10 | 8.3 |
| Trisodium Versenate only | 0.09 | 7.0 |
| Polysaccharide sulfate plus trisodium Versenate | 2.32 | 10.5 |

EXAMPLE 6

*Polysaccharide Sulfate Plus Sodium Versenate at Various pH Levels in Rats*

Three groups of rats were fasted and then administered by stomach tube the same polysaccharide sulfate employed in Example 1 above (500 gm./kg.) plus sodium Versenate (500 mg./kg.) titrated to the desired pH with sodium hydroxide. The animals were sacrificed 4 hours later and blood obtained by cardiac puncture was tested for lipemia-clearing activity. The results are given below:

| pH | Clearing activity (Grossman units) | Number of rats |
|---|---|---|
| 5.2 | 2.80±1.08 | 6 |
| 7.0 | 3.01±0.96 | 9 |
| 9.0 | 5.00±0.58 | 4 |

These results show effective absorption of the drug over the pH range 5 to 9 with considerable increase in activity at the higher pH.

EXAMPLE 7

*Effect of Ratio Polysaccharide Sulfate to Adjuvant on Oral Activity in Dogs*

In the present experiments various doses of adjuvant with a given dose of polysaccharide sulfate were tried, ranging from 1:1 to 1:10 at a dose of 50 mg./kg. of the potassium polysaccharide sulfate, and from 1:2 to 1:1 at 25 mg./kg. of the polysaccharide sulfate.

At the 50 mg./kg. dose of polysaccharide sulfate, tripotassium Versenate was given at 50, 25, 15, and 5 mg./kg.

At the 25 mg./kg. dose of polysaccharide sulfate, tripotassium Versenate was given at 50 and 25 mg./kg. After administration of the materials, blood specimens were drawn hourly for 5 hours, and analysed for clearing activity.

A summary of lipemic clearing activities is tabulated in the following table:

| Drug dose | Adjuvant dose (mg./kg.) | Number of dogs | Clearing activity ± S.D. (G.U.) | | | | |
|---|---|---|---|---|---|---|---|
| | | | 1 hr. | 2 hr. | 3 hr. | 4 hr. | 5 hr. |
| 50 mg./kg | 50 | 4 | 4.30±2.18 | 4.83±2.41 | 4.78±1.48 | 3.90±0.92 | 3.53±1.81 |
| 50 mg./kg | 25 | 4 | 4.05±2.40 | 4.13±1.73 | 3.44±1.85 | 3.20±2.04 | 2.19±2.36 |
| 50 mg./kg | 15 | 6 | 3.59±1.03 | 3.77±1.64 | 2.30±1.79 | 1.51±1.73 | 0.86±0.97 |
| 50 mg./kg | 5 | 5 | 1.93±2.05 | 1.73±1.99 | 1.38±1.21 | 0.94±1.07 | 0.87±1.16 |
| 25 mg./kg | 50 | 4 | 0.82±0.56 | 3.01±1.56 | 3.29±1.58 | 2.33±1.36 | 1.41±1.07 |
| 25 mg./kg | 25 | 4 | 2.02±2.12 | 2.61±2.30 | 1.70±2.20 | 1.18±1.53 | 0.86±1.09 |
| 25 mg./kg | 25 | 3 | 1.02±0.83 | 1.58±1.23 | 0.63±0.47 | 0.43±0.41 | 0.37±0.47 |

NOTE.—The drug given was a potassium corn syrup solids sulfate having an average molecular size of 10 glucose units per molecule and containing 2.40 sulfate units per molecule. S.D. equals standard deviation, G.U. equals Grossman units.

EXAMPLE 8

*Effect of Potassium Versenate on Oral Absorption of the Potassium Salt of Polysaccharide Sulfate in Humans*

Hard gelatin capsules were prepared each containing the following amounts of materials:

| | Mgm. |
|---|---|
| Potassium salt of polysaccharide sulfate (having an average molecular size of 8.6 glucose units, an average molecular weight 4200 and 2.76 sulfate groups per glucose unit; said polysaccharide sulfate being produced from the corn syrup solids of 43° Baumé corn syrup in accordance with the procedure of Example 6 of the above-identified application of F. J. Petracek et al.) | 500 |
| Potassium Versenate (pH 7) | 250 |
| Total | 750 |

Eight of these capsules were administered orally to five human subjects. Two hours after the administration of the drug the plasma of these subjects showed an average lipemia-clearing activity of 1.84 Grossman units. This compares to a pretreatment normal value of 0.03 Grossman units. When the potassium polysaccharide sulfate was given without the potassium Versenate no absorption of the drug from the G.I. tract took place as evidenced by the fact that the 2 hour plasma of the same subjects showed a lipemia-clearing activity of 0.03 Grossman units.

It is known that potassium Versenate per se has no lipemia-clearing action.

As will be apparent to those skilled in the art, other therapeutic agents, such as those discussed hereinabove in the present specification, may be employed in the foregoing examples. Similarly, other complexing agents or adjuvants discussed in the specification may also be employed in the foregoing examples.

Experiments indicate that the intravenous injection of alkali-metal salt of Versene simultaneously with oral or intravenous administration of polysaccharide sulfate has no effect on lipemic clearing activity or coagulation time at 4 hours. This indicates that the adjuvant must be present in the gastro-intestinal tract together with the therapeutic agent to cause effective absorption of the therapeutic agent.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A therapeutic composition for oral administration comprising a therapeutic substance selected from the class consisting of anticoagulant and antilipemic polysaccharide sulfates which are ordinarily not effective when administered per os and the therapeutic effect of which depends on its being absorbed into the blood stream, and an adjuvant compound comprising an alkali-metal salt, substantially free from magnesium and calcium ions, of an amino acid which is symmetrically substuted on a nitrogen atom and which will chelate an alkaline-earth metal selected from the class consisting of calcium and magnesium.

2. A therapeutic composition according to claim 1 wherein the amino acid is a polyamine-polyacid.

3. A therapeutic composition according to claim 2, in which the polyamine-polyacid adjuvant compound is a salt of ethylene diamine tetracetic acid.

4. A therapeutic composition according to claim 1 in which the polysaccharide sulfate is heparin.

5. A therapeutic composition according to claim 1, in which the corn polysaccharide sulfate is a sulfated starch dextrin.

6. A therapeutic composition according to claim 1, in which the polysaccharide sulfate is a sulfated corn syrup solids.

7. A therapeutic composition according to claim 1, in which a member selected from the group consisting of a potassium salt and a sodium salt of the adjuvant compound is employed.

8. A therapeutic composition according to claim 1, in which the ratio by weight of the adjuvant compound to the therapeutic substance is at least 1:8.

9. A therapeutic composition according to claim 1 wherein the polysaccharide sulfate is selected from the class consisting of corn syrup solids and corn starch dextrin and containing an average of between about 5 and 15 glucose units per molecule joined predominantly by alpha 1,4 and alpha 1,6 linkages and containing between about 1.5 and 3 sulfate groups per glucose unit.

10. The process of administering orally to a mammal a medicinal substance selected from the class consisting of anticoagulant and antilipemic polysaccharide sulfates which are ordinarily not effective when administered per os and the therapeutic effect of which depends upon its being absorbed into the blood stream, which comprises administering said medicinal substance and a complexing substance comprising an alkali-metal salt, substantially free from magnesium and calcium ions, of an amino acid which is symmetrically substituted on a nitrogen atom and which will chelate an alkaline-earth metal selected from the class consisting of calcium and magnesium, thereby enabling said medicinal substance to be absorbed from the gastro-intestinal tract.

References Cited in the file of this patent

UNITED STATES PATENTS

| 2,656,298 | Lowe | Oct. 20, 1953 |
| 2,816,060 | Carter | Dec. 10, 1957 |

(Other references on following page)

OTHER REFERENCES

The Modern Chelating Agent, Tech. Bull., No. 1, 1949, Bersworth Chem. Co., Framingham, Mass., page 10.

Drug and Cos. Ind., 70:2, February 1952, p. 251.

Eisner: The J. of Pharmacology and Experimental Therapeutics, August 1953, pages 442 to 449.

Salomon: Proc. Soc. Exptl. Biol. Med. 84:2, November 1953, pp. 476–478.

Amer. J. Physiology, vol. 177, May 1954, pp. 339–340.

Schroeder: J. of Chronic Diseaes, vol. 4, No. 5, November 1956, pages 461–468.

New and Nonofficial Drugs, 1956, pages 262 to 264 and 389, Lippincott Co., Philadelphia, Pa.

Cho: Chem. Abst., vol. 50, 1956, page 14023a.

Chenoweth: Pharmacological Reviews, vol. 8, 1956, pp. 57–80.

J.A.M.A., 163:5, February 2, 1957, p. 402.

J. Pharm. and Pharm., June 1957, p. 421.

Ant. Med. and Clin. Therap. 4:3, March 1957, p. 183.

Kuo: Federation Pracs., March 1958, p. 91, No. 359.